(12) United States Patent
Sakata et al.

(10) Patent No.: US 8,406,369 B2
(45) Date of Patent: Mar. 26, 2013

(54) FUEL ASSEMBLY FOR PWR NUCLEAR REACTOR

(75) Inventors: Hideyuki Sakata, Hyogo (JP); Yasunao Yamaguchi, Hyogo (JP); Jun Shimizu, Tokyo (JP); Shigeyuki Watanabe, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 821 days.

(21) Appl. No.: 12/063,348

(22) PCT Filed: Feb. 15, 2007

(86) PCT No.: PCT/JP2007/053236
§ 371 (c)(1),
(2), (4) Date: Oct. 15, 2008

(87) PCT Pub. No.: WO2007/094509
PCT Pub. Date: Aug. 23, 2007

(65) Prior Publication Data
US 2009/0285347 A1   Nov. 19, 2009

(30) Foreign Application Priority Data
Feb. 17, 2006   (JP) .................................. 2006-041393

(51) Int. Cl.
*G21C 1/04* (2006.01)
(52) U.S. Cl. ........................................ 376/352; 376/347
(58) Field of Classification Search .................. 376/347, 376/352, 438, 453, 441, 446, 462
See application file for complete search history.

(56) References Cited

U.S. PATENT DOCUMENTS 4,716,016 A   12/1987   Demario et al.
4,792,429 A   12/1988   Hatfield (Continued)

FOREIGN PATENT DOCUMENTS

EP   4325216 A1   2/1995
JP   61-258191 A   11/1986

(Continued)

OTHER PUBLICATIONS

Chinese Office Action dated Nov. 15, 2010, issued in corresponding Chinese Patent Application No. 200780000827.0.

(Continued)

*Primary Examiner* — Jack W Keith
*Assistant Examiner* — Marshall O'Connor
(74) *Attorney, Agent, or Firm* — Westerman, Hattori, Daniels & Adrian, LLP

(57) ABSTRACT

Provided is a fuel assembly 1 for a PWR nuclear reactor capable of stably creating transverse flows of coolant for pressing and securing control rods so as to restrain vibration of the control rods in order to restrain the outer surfaces of the control rods and the inner surfaces of control rod guide tubes from being worn, wherein an upper nozzle arranged above the fuel assembly comprises an adapter plate 6 constituting the lower structure of the upper nozzle, a side wall extended along the periphery of the adapter plate, an overhang projected into a space above the adapter plate from the upper part of the side wall, and apertures for attaching control guide tubes and passage holes, which are formed in the passage surface of the adapter plate, and wherein those 15A, 15B, 15C of the passage holes which are located at positions where the coolant impinges upon the overhang are generally arranged, line-symmetric with respect to diagonal lines of the passage surface serving as symmetric axes Q, and ligaments 21, 23 around the passage holes located inside and outside of those 11a of the attaching apertures which are located on the outer peripheral side are set to be larger than ligaments 22 around the passage holes which are located on opposite transverse sides of those of the attaching apertures.

7 Claims, 9 Drawing Sheets

U.S. PATENT DOCUMENTS

| | | | |
|---|---|---|---|
| 4,986,959 A | 1/1991 | Sparrow et al. | |
| 5,053,191 A | 10/1991 | Bryan et al. | |
| 5,160,697 A * | 11/1992 | Verdier et al. | 376/352 |
| 5,267,287 A | 11/1993 | Bryan | |
| 5,271,053 A | 12/1993 | Bryan | |
| 5,276,721 A | 1/1994 | Beuerlein | |
| 6,049,581 A * | 4/2000 | Mayet et al. | 376/352 |

FOREIGN PATENT DOCUMENTS

| | | |
|---|---|---|
| JP | 62-46292 A | 2/1987 |
| JP | 2-6784 A | 1/1990 |
| JP | 11-295461 A | 10/1999 |
| JP | 2000-504108 A | 4/2000 |
| JP | 2003-098285 A | 4/2003 |
| JP | 2003-98285 A | 4/2003 |
| JP | 2005-214838 A | 8/2005 |
| WO | 00/16339 A1 | 3/2000 |

OTHER PUBLICATIONS

International Search Report of PCT/JP2007/053236, date of mailing May 22, 2007.

European Search Report dated Feb. 25, 2011, issued in corresponding European Patent Application No. 07714736.1.

* cited by examiner

Prior Art

Internal structure of reactor vessel    Schematic perspective view of fuel assembly Prior Art Prior Art

FUEL ASSEMBLY FOR PWR NUCLEAR REACTOR

TECHNICAL FIELD

The present invention relates to a fuel assembly used in a light-water reactor, especially a pressurized water nuclear reactor (PWR nuclear reactor) and in particular to a fuel assembly for a PWR nuclear reactor which is equipped with a structure for restraining the fretting wear between the outer surfaces of the control rod and the inner surface of control rod guide tubes in the fuel assembly.

BACKGROUND ART

In general, as is disclosed in Patent Document 1 (Japanese Patent Laid-Open No. S62-46292) and Patent Document 2 (Japanese Patent Laid-Open No. H2-6784), a fuel assembly used in a pressurized water nuclear reactor has such a structure that several fuel rods are bundled, that is, in general, several fuel assemblies each composed of bundled several fuel rods are loaded in a reactor vessel suspended in a reactor vessel incorporating an inlet nozzle and an outlet nozzle for a coolant. The fuel assembly has an upper nozzle and a lower nozzle which are opposed to and spaced from each other, and which are connected to each other through the intermediary of control rod guide tubes attached thereto with a plurality of support grids. The control rod guide tubes are inserted in a part of cells in each support grid, and the several fuel rods are inserted in the remaining part of cells.

FIGS. 10 to 13 show a specific configuration of the fuel assembly. Referring to FIG. 10, a control rod assembly used in a pressurized water nuclear reactor is composed of a plurality of control rods 51 suspended from a spider 52 adapted to be driven by a control rod drive unit which is not shown. In the control rod assembly as stated above, as shown in FIG. 11, the control rods 51 are driven by the control rod drive unit so that the control rods are inserted and pulled in the control rod guide tubes 53 within the fuel assembly loaded in the nuclear reactor, deeply and shallowly in order to control the reactivity of the nuclear reactor core.

However, the control rods 51 are used, being inserted in the control guide tubes 53 within the fuel assembly while they are driven by the control rod drive mechanism during operation of the nuclear reactor, and accordingly, the control rods 51 vibrate due to flows of a coolant during operation of the nuclear reactor so as to make contact with the control guide tubes, possibly resulting in such a risk that the outer surfaces of the control rods are worn. Further, the inner surfaces of the control rod guide tubes 53 would be possibly worn due to the vibration of the control rods 51.

The above-mentioned abrasions are caused by affection of vibration of the control rods 51 due to turbulence of a coolant flow, that is, the coolant in the flow (a core flow directing upward from the lower side) flows transversely through a gap between the control guide tubes 54 (which will be hereinbelow referred to as "G/T") which have a role of guiding the control rods when the control rod assembly is driven by the control rod drive mechanism, and an upper core plate 55 (which will be referred to as "UCP") and a gap between the UCP 55 and the upper nozzle 56 of the fuel assembly located therebelow (refer to FIG. 12). Thus, it is construed that the control rods vibrate due to the transverse flow, and accordingly, the abrasion would be gradually progressed.

It is noted here that in comparison with the control rods 51 which are located on the side which is near to the attachment positions of support pins 57 (two pins arranged, left-right symmetrically) for preventing transverse displacement of the G/T 54, the control rods 51 on the side where no support pins 57 are present seem to be greatly affected by the coolant flow. Thus, it is considered that those of the control rods located on the side where no support pins 57 are present are locally worn by a large degree. Further, there would be such a risk that the associated control rod guide tubes 53 in which those of the control rods 51 are inserted are worn at their inner surfaces on the fuel assembly side.

As shown in FIG. 13, it would be also considered that the longitudinal directions of passage holes formed in an adapter plate 58 which constitutes the lower part of the upper nozzle 56 of the fuel assembly greatly affect upon the degree of abrasion. That is, the passage holes 58A are all formed in one and the same direction (the longitudinal direction of the passage hole 58A is indicated by the arrow B as shown in FIG. 13), and accordingly, the flow of the coolant flowing upward from the bottom of the fuel assembly (in the direction piercing the sheet of FIG. 3 from the rear surface to the front surface) passes through the passage holes 58A in the upper nozzle 56, and is then jetted into the upper nozzle 56, being guided by the shapes of the passage holes. The area of the passage holes is greater in the vicinity of the walls on the sides A, that is, on the support pin 57 sides, than in the vicinity of the walls on the sides B where no support pins 57 are present, which are adjacent to the sides A, and accordingly, the quantity of the jetted coolant becomes remarkably greater on the sides A. Since the flows of the coolant impinge upon an overhang formed at the upper end of the upper nozzle 56, and are then directed toward the center of the adapter plate 58, the degree of jetting is different between the sides A and the sides B, resulting in occurrence of such a risk that the flows toward the center of the adapter become unbalance.

Further, due to instability caused by the unbalance flows of coolant toward the center of the adapter 56, there would be caused such a risk that the associated control guide tubes in which the control rods 51 are inserted are greatly worn at their inner surfaces on the fuel assembly side. Thus, there would be presented such a problem that the cause of accelerating the abrasion as stated above is duplicated in such a case that the direction in which no support pines are located coincides with the direction of the passage holes 58A in the upper nozzle 56.

Thus, Patent Document 3 (Japanese Patent Laid-Open No. 2003-98285) discloses a configuration in which the passage holes formed in the adapter plate constituting the lower structure of the upper nozzle are arranged such that the direction of the passage holes is orthogonal to the direction of the sides where there are presented no support pins attached to the control guide tubes and inserted in the upper core plate for preventing the control guide tubes from being transversely shifted. Further, Patent Document 3 also discloses a configuration of the adapter plate constituting the lower structure of the upper nozzle, in which the number of passage holes having a longitudinal direction along the sides where no support pins are present, is decreased with respect to the total number of them, and a configuration in which the passage holes are arranged in the passage surface of the adapter plate so that the passage areas in four zones partitioned by two orthogonal lines passing through the center and diagonal corners of the passage surface of the adapter plate become uniform. With this configuration, the vibration caused by the coolant flow can be uniformed so as to restrain local abrasion.

As stated above, since the control rods in the conventional fuel assembly vibrate due to the transverse coolant flow, there would be possibly caused such a problem that the outer surface of the control rods and the inner surfaces of the control rod guide tubes are worn.

Although the configuration disclosed in Patent Document 3 may more or less improve such abrasion, the present invention proposes such a technology that the vibration of the control rods is further settled in order to minimize the abrasion.

DISCLOSURE OF THE INVENTION

The present invention is devised in view of the above-mentioned problems inherent to the conventional technology as stated above, and accordingly, one object of the present invention is to provide a fuel assembly for a PWR nuclear reactor, which can stably create flows of coolant directed toward the center of the control rods in order to press and fix control rods for restraining vibration of the control rods so that the outer surfaces of the control rods and the inner surfaces of the control rod guide tubes can hardly worn locally.

To the end, according to the present invention, there is provided a fuel assembly for a PWR nuclear reactor, including an upper nozzle arranged in the upper part of the fuel assembly and comprising an adapter plate constituting a lower structure of the upper nozzle, an upright side wall extended along the periphery of the adapter plate, and an overhang projected into a space above the adapter plate from the upper part of the side wall, apertures for attaching control guide tubes and passage holes formed in a passage surface of the adapter plate, characterized in that at least those of the passage holes which are located at positions where coolant impinges upon the overhang, are generally arranged, line-symmetric with respect to two orthogonal lines passing through the center and diagonal corners of the passage surface, and ligaments around those of the passage holes which are located inside and outside of the those of the attaching apertures which are located on the outer peripheral side, are greater than ligaments around those of the passage holes which are located on opposites transverse sides of the attaching apertures.

According to the preset invention, the coolant from the passage holes are directed toward the center of the adapter plate, after being turned into a direction toward the center of the adapter after impinging upon the overhang, can flow smoothly without being hindered by jet streams from elongated holes in the adapter plate, on the wide ligaments, and further, a pressure increase upon impingement against the overhang propagates on the ligaments so as to increase a pressing force toward the center of the upper nozzle, against the control rods arranged in the attaching apertures, and accordingly, it is possible to restrain vibration of the distal end parts of the control rods. Thus, since the vibration of the control rods can be restrained, it is possible to restrain the inner surfaces of the control rod guide tubes and the outer surfaces of the control rods from being worn.

Further, since the arrangement of the passage holes is line-symmetric about the symmetric axes, and since arrangement patterns of passage holes in four zones which are partitioned from one another by the symmetric axes are set to be identical with each other, the vibrations of the distal end parts of the control rods located on the outer peripheral side can be restrained, commonly in the four zones.

Further, the present invention is characterized in that passage holes for rectifying the coolant flow are arranged in the vicinity of the attaching apertures located along the symmetric lines.

Thus, with the provision of the passage holes for rectifying the coolant flow, transverse flows directed toward the control rods are created so as to secure the control rods which are therefore restrained from vibrating, thereby it is possible to restrain the inner surfaces of the control guide tubes and the outer surfaces of the control rod from being worn.

Further, the present invention is characterized in that elongated passage holes for rectifying flows of coolant are arranged in the vicinity of the center part of the passage surface.

In view of the above-mentioned configuration, it is possible to prevent the coolant flow around the center part of the passage surface from being diffused, and to create the coolant flow for pressing the control rods.

Moreover, the present invention is characterized in that those of the passage holes which are located at positions where the coolant impinges upon the overhang, are elongated having a length longer than that of the passage holes located in the inner side of the passage surface.

With this configuration, the pressing force against the control rods by the flows of the coolant can be increased, and accordingly, it is possible to further restrain vibration of the control rods.

Further, the present invention is characterized in that a plurality of fuel assemblies according to the present invention as stated above are uniformly arranged in the core of the nuclear reactor.

Thus, with a plurality of the fuel assemblies arranged uniformly in the core of the nuclear reactor, it is possible to effectively restrain vibration of the control rods in the core.

As stated above, according to the present invention, since the ligaments around the passage holes have sizes which are different from one another, the pressing force acts upon the control rods, being directed toward the centers thereof, and accordingly, vibration of the distal ends of the control rods can be restrained while vibration of the control rods can be also restrained, thereby it is possible to restrain the inner surfaces of the control rod guide tubes and the outer surfaces of the control rods from being worn.

Further, the passage holes are arranged, line-symmetric about the symmetric axes, and the arrangement patterns of the zones which are partitioned by the symmetric axes are identical with each other, thereby it is possible to restrain vibration of the distal end parts of the control rods which are present in the outer peripheral part, commonly in the four zones.

BEST MODE OF THE INVENTION

Next, explanation will be made of preferable exemplary embodiments of the present invention with reference to the accompanying drawings. It is noted here that the dimensions, materials, shapes and relative arrangements of components stated in these embodiments are mere examples for explaining the present invention, and accordingly, should not be intended to limit the technical scope of the present invention thereto unless otherwise specified.

Figure 1:
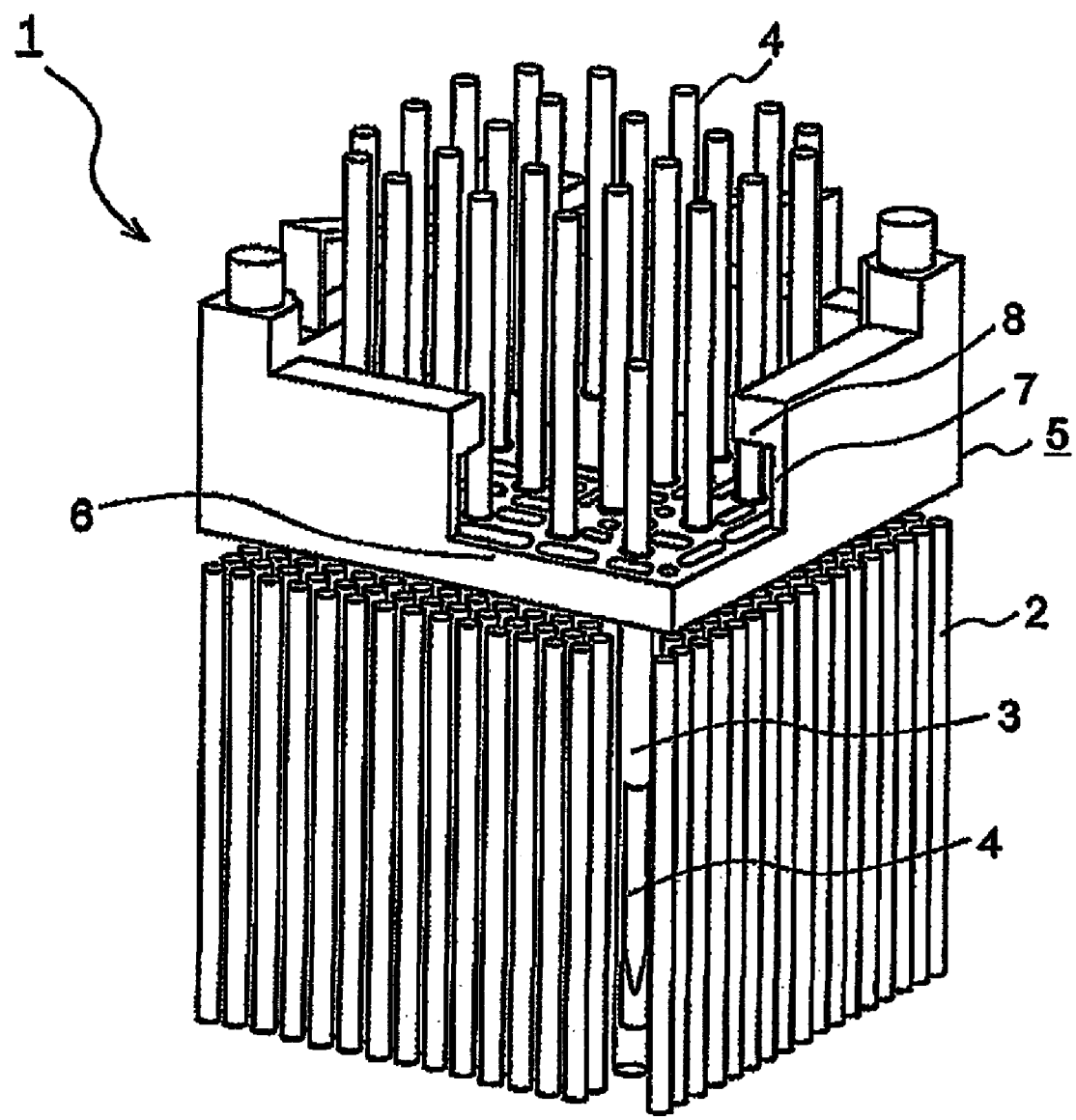
FIG. 1 is a perspective view illustrating a fuel assembly for a PWR nuclear reactor core in an embodiment of the present invention.

FIG. 1 is a perspective view illustrating a fuel assembly for a PWR nuclear reactor, in the embodiments of the present invention, and FIGS. 2 to 9 are views for explaining an upper nozzle of the fuel assembly in embodiments 1 to 8.

At first, referring to FIG. 1, a fuel assembly for a PWR nuclear reactor, according to the present invention, will be outlined. In this figure, the fuel assembly 1 used in the PWR nuclear reactor incorporates an upper nozzle 5 and a lower nozzle (which is not shown), which are opposed to each other, being vertically spaced from each other, the upper nozzle 5 and the lower nozzle having a plurality of coolant passages, and being connected to each other through the intermediary of a plurality of control rod guide tubes 3. A plurality of support grids (which are not shown) are secured to the control rod guide tubes 3, at intervals in the longitudinal direction of the fuel assembly 1, and support several fuel rods 2 so that the fuel rods 2 are extended in parallel with one another.

The control rod guide tubes 3 serve as guides for driving control rods by means of a control rod drive unit. The upper nozzle 5 is composed of a planar adapter plate 6 for constituting the lower structure of the nozzle, an upright side wall 7 extended along the periphery of the adapter plate 6, and an overhang 8 projected into a space above the adapter plate from the upper part of the side wall 7.

Further, the adapter plate has a passage surface which is formed therein with a plurality of apertures for attaching control rod guide tubes 3, and as well, a plurality of coolant passage holes. The configurations of attaching apertures and the coolant passage holes will be detailed in embodiments 1 to 10 which will be explained hereinbelow.

The control rods 4 are driven by a control rod drive unit so as to be inserted into and pulled from the control rod guide tubes 3 in order to control the reactivity of the nuclear reactor core. Further, coolant flows from the lower part to the upper part of the fuel assembly, and then flow upward from the passage holes in the adapter plate 6 after cooling the fuel rods 2.

(Embodiment 1)

Figure 2:
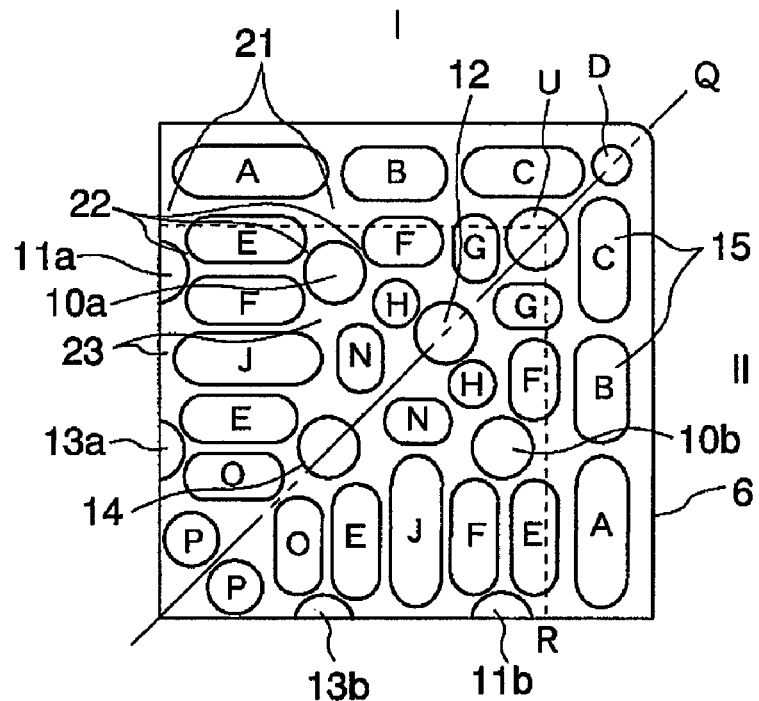
FIG. 2 is a schematic view illustrating a cross section of an upper nozzle in an embodiment 1 of the present invention.

Referring to FIG. 2, explanation will be made of the aperture for attaching the control rod guide tubes and the passage holes 15, which are formed in the adapter plate 6 of the fuel assembly in an embodiment 1.

In this embodiment, two orthogonal lines passing through the center and the diagonal corners of the passage surface of the adapter plate 6 are used as symmetric axes (diagonal lines) Q, and the attaching apertures and the passage holes as stated above are generally arranged, line symmetric with respect to the symmetric axes Q. Thus, FIG. 2 shows one of rectangular four zones into which the adapter plate 6 is equally divided, having an equal passage area. The broken line R shown in the figure indicates a position corresponding to the overhang 8.

The adapter plate 6 is formed therein with passage holes 15 (A to H, J, N to P) which are arranged, line-symmetric with respect to the symmetric axis Q. It is noted that at least passage holes 15A, 15B, 15C, 15D which are formed at positions where the coolant impinges upon the overhang 8, should be arranged line-symmetrically, but the other passage holes should not be arranged line-symmetrically.

Further, the passage holes 15A, 15B, 15C, 15D which are arranged at the positions where the coolant impinges upon the overhand 8, are preferably elongated holes extended in parallel with the overhang 8.

Further, the adapter plate 6 is formed therein with apertures 10a, 10b, 11a, 11b, 12, 13a, 13b for attaching the control guide tubes.

In this embodiment, those 11A, 11b of the attaching apertures, which are located on the outer peripheral side of the adapted plate and which are arranged on lines that pass through the center of the adapter plate and extend in parallel with sides of the adapter plate are formed such a way that ligaments 21 around the passage holes located on the outer peripheral side of the attaching apertures 11a, 11b are larger than ligaments 22 around the passage holes which are arranged on opposite transverse sides of the attaching apertures 11a, 11b. That is, the ligaments 21 on the outer peripheral side are wider, but the ligaments 22 on the opposite transverse sides are narrower as possible as it can.

With this configuration, the transverse flows of the coolant from the above-mentioned passage holes 15A, 15B, 15C, 15D, merge into the wide ligaments 21, and can hardly flows on the narrower ligaments 22. Thus, the pressing force against the control rods set in the attaching apertures 11a, 11b, directed toward the center of the upper nozzle becomes larger, thereby it is possible to restrain vibration of the distal ends of the control rods. Thus, due to the restraint to the vibration of the control rods, it is possible to prevent abrasion of the inner surfaces of the control rod guide tubes and the outer surfaces of the control rods.

The above-mentioned technical effects and advantages can be also applied to the control rods on both sides I and II of the adapter plate 6 since the passage holes are arranged, symmetric with respect to the axes Q.

Further, even the ligaments 21 around the passage holes which are located on the outer peripheral sides of the attaching apertures 10a, 10b are set to be larger than the ligaments 22 around the passage holes on opposite transverse sides of the attaching apertures 10a, 10b. With this configuration, the control rods can also hardly be vibrated.

Further, since the passages holes 15A, 15B, 15C located at positions where the coolant impinges upon the overhand 8 are elongated in parallel with the overhang 8, the flows of the coolant from the passage holes 15A, 15B, 15C have larger pressing forces, thereby it is possible to further restrain vibration of the control rods.

Further, in this embodiment, it is preferable to evenly arrange a plurality of fuel assemblies according to the present invention in the core of a nuclear reactor, thereby it is possible to effectively restrain the vibration of the control rods in the core.

(Embodiment 2)

Next, explanation will be made of the apertures for attaching the control rod guide tubes, and the passage holes 15, which are formed in the adapter plate 6 of the fuel assembly, in an embodiment 2. It is noted that explanation to the configurations similar to those explained in the embodiment 1 will be omitted in the following embodiments 2 to 8 shown in FIGS. 3 to 9.

Figure 3:
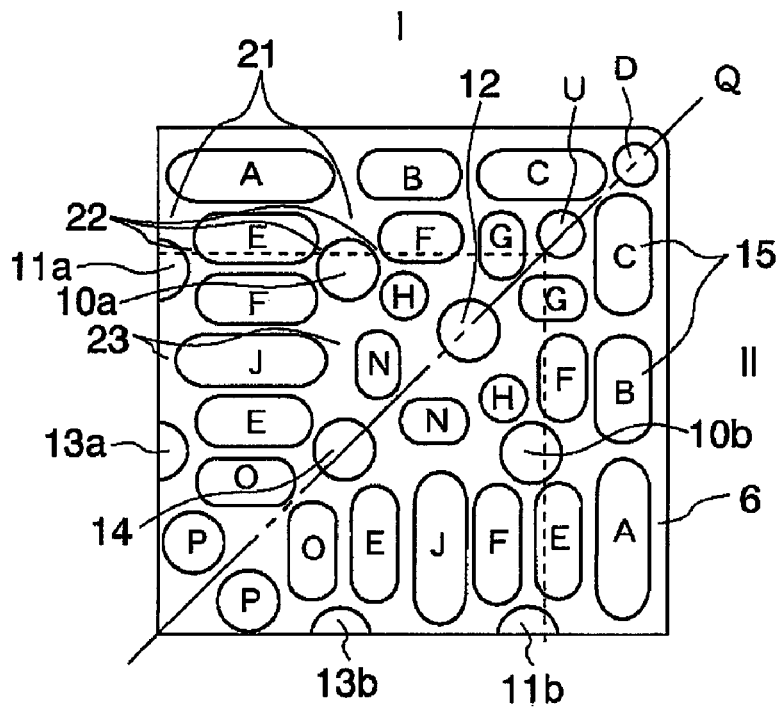
FIG. 3 is a schematic view illustrating a cross-section of an upper nozzle in an embodiment 2 of the present invention.

FIG. 3 shows only one of four divided zones of the adapter plate 6, similar to the embodiment 1. In the embodiment 2, of the attaching apertures, those 10*a* which are located on the outer peripheral side of the adapter plate and which are located in the vicinity of the center of the subdivided zones into which the zone shown is further bi-divided by the symmetric line Q are configured so that the ligaments 21 around the passage holes located on the outer peripheral sides of the attaching apertures 10*a*, 10B are larger than the ligaments 22 around the passage holes on opposite transverse sides of the attaching apertures 10*a*, 10*b*. That is, the ligaments 21 on the outer peripheral sides and the ligaments 23 on the inner peripheral sides are set to be larger, but the ligaments 22 on the transverse opposite sides are set to be small as possible as it can. Thereby it is possible to obtain technical effects and advantages which are similar to those obtained in the embodiment 1.

(Embodiment 3)

Figure 4:
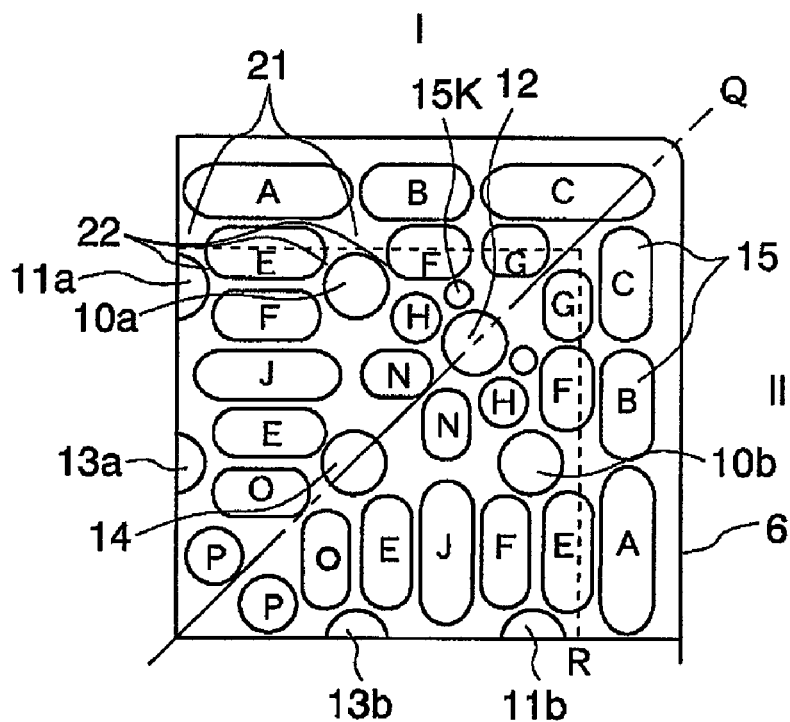
FIG. 4 is a schematic view illustrating a cross section of an upper nozzle in an embodiment 3 of the present invention.

FIG. 4 shows an arrangement pattern of apertures for attaching the control guide tubes and passage holes 15 formed in an adapter plate 6 of a fuel assembly in an embodiment 3 in which only one of the four divided zones of the adapter plate 6 is shown, similar to the embodiment 1. In this embodiment 3, explanation will be specifically made of those 12 of the attaching apertures, which are located on the outer peripheral side of the adapter and which are located on the symmetric axe Q. Since these apertures located as mentioned above are positioned in the vicinity of the corners of the adapter plate, the flows of the coolant are complicated. Thus, passage holes 15K for rectifying the flows of the coolant are formed in the vicinity of the attaching apertures 12, thereby it is possible to restrain vibration of the control rods in order to stabilize the control rods. Further, since the arrangement pattern of the passage holes 15N in this embodiment is different from that of the embodiment 1 so that the passage holes 15N are elongated in parallel with the overhand 8, the flows of the coolant toward the attaching holes 12 are further stabilized, thereby it is possible to further restrain vibration of the control rods. Further, the shapes of the passage holes 15C in the sides I and II are preferably set to be asymmetric. In this embodiment, the passage holes 15C on the side I have a major diameter which is greater than that of the passage holes 15C on the side II. Thereby it is possible to obtain such technical effects and advantages that the flows of the coolant can be prevented from being complicated.

(Embodiment 4)

Figure 5:
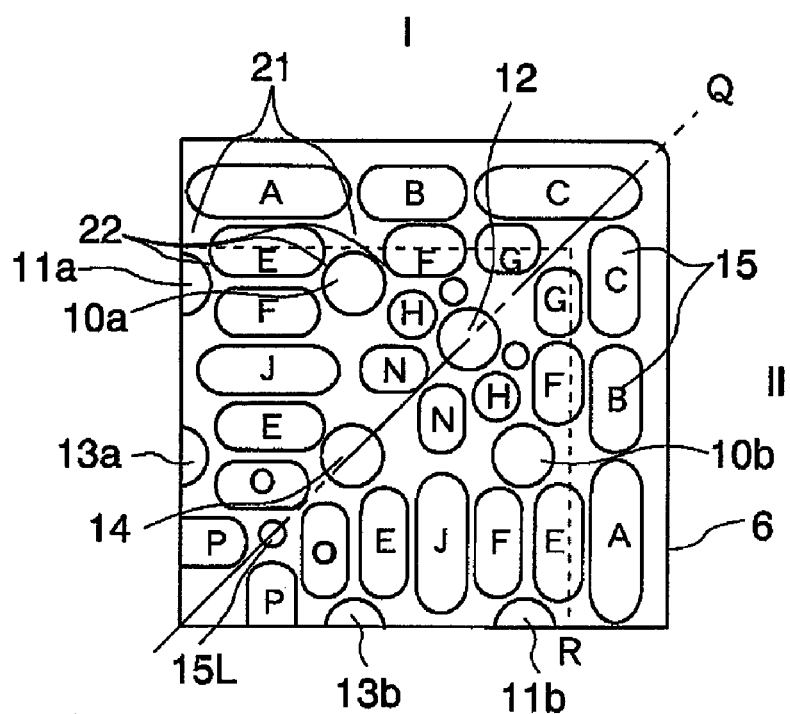
FIG. 5 is a schematic view illustrating a cross-section of an upper nozzle in an embodiment 4 of the present invention.

FIG. 5 shows the arrangement pattern of apertures for attaching control rod guide tubes and passage holes 15, which are formed in an adapter plate 6 of a fuel assembly in an embodiment 4 in which only one of four divided zones of the adapter plate 6 is shown, similar to the embodiment 1. In this embodiment 4, elongated passage holes for rectifying flows of coolant are located in the vicinity of the center part of the passage surface of the adapter plate. Specifically, elongated passage holes 15P, 15P are formed, surrounding the center, and small diameter holes 15L are formed, which occupy between the passage holes 15P, 15P. With this configuration, the flows of the coolant in the center part of the passage surface are diffused, thereby it is possible to create flows capable of pressing the control rods. Further, the shapes of passage holes 15C on the sides I and II are set to be asymmetric, thereby it is possible to obtain such technical effects and advantages that the flows of the coolant can be prevented from being complicated.

(Embodiments 5 to 8)

Figure 6:
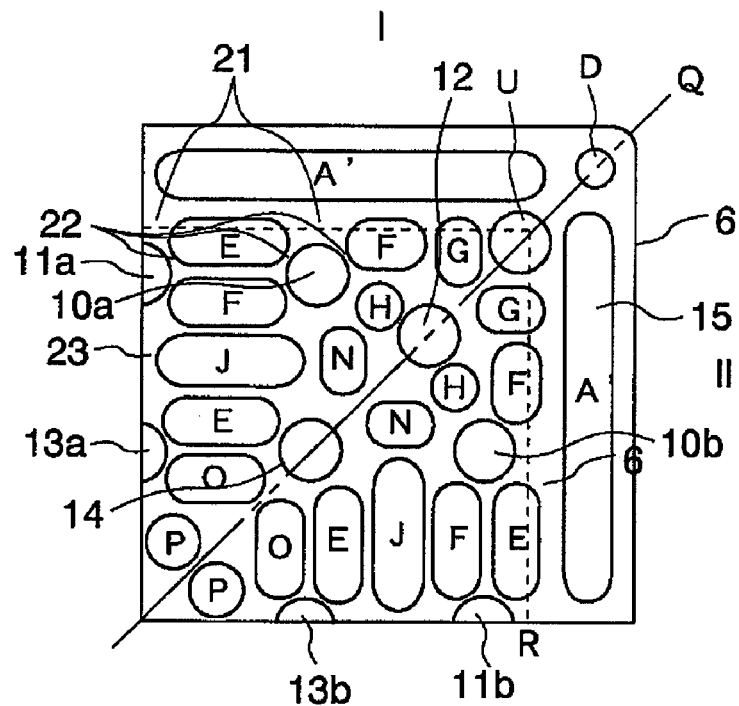
FIG. 6 is a schematic view illustrating an upper nozzle in an embodiment 5 of the present invention, corresponding to FIG. 2.
Figure 7:
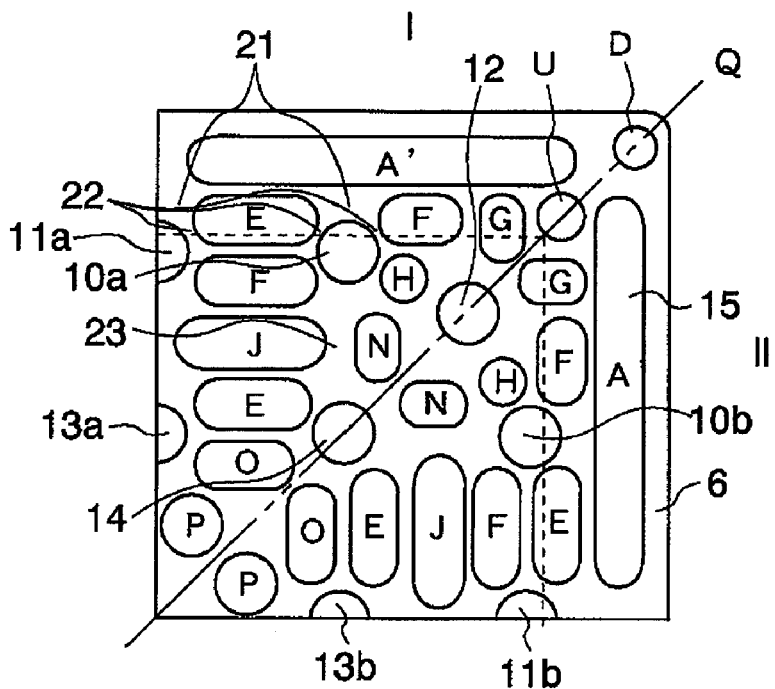
FIG. 7 is a schematic view illustrating an upper nozzle in an embodiment 6 of the present invention, corresponding to FIG. 3.
Figure 8:
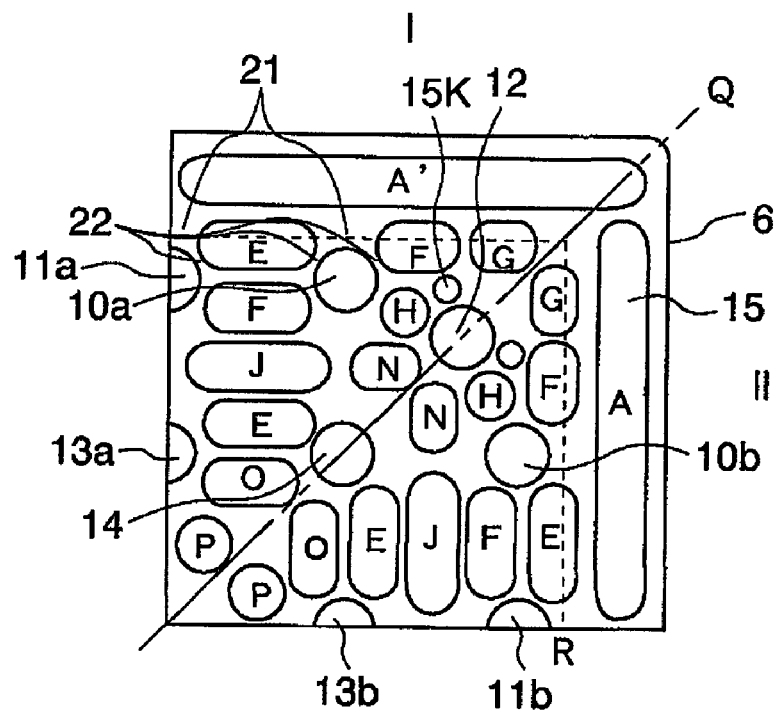
FIG. 8 is a schematic view illustrating an upper nozzle in an embodiment 7, corresponding to FIG. 4.
Figure 9:
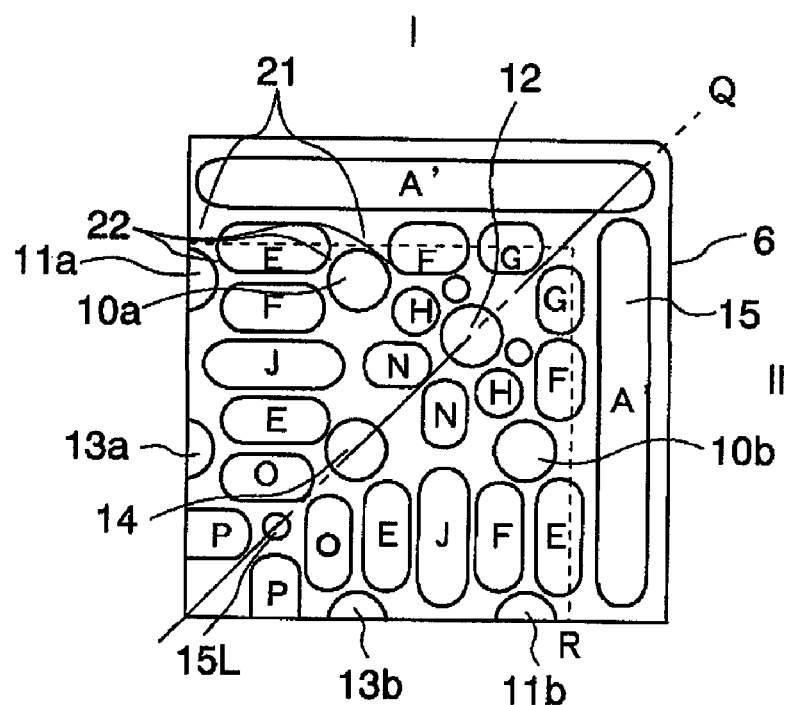
FIG. 9 is a schematic view illustrating an embodiment 8, corresponding to FIG. 5.
Figure 10:
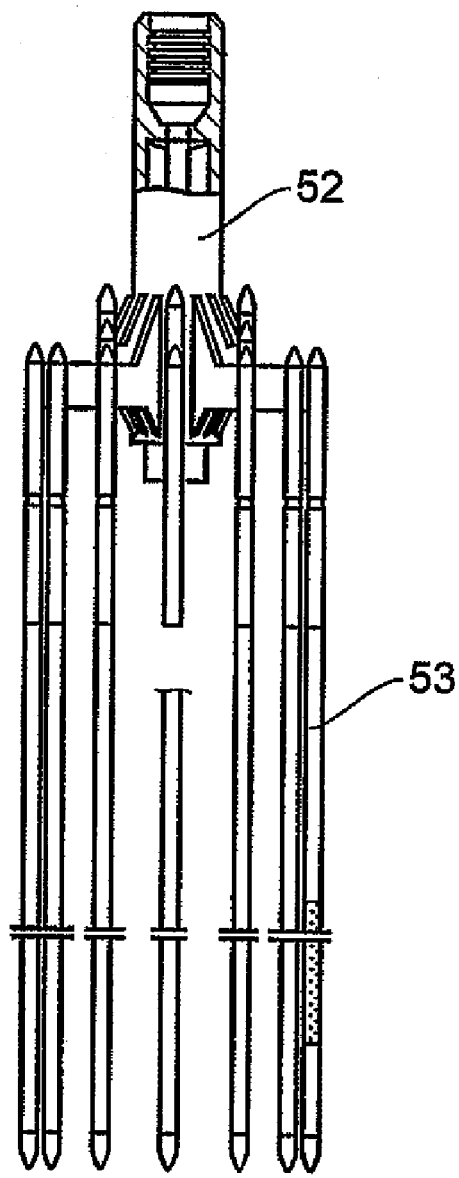
FIG. 10 is a schematic view illustrating a configuration of a control rod assembly which is in general used in a pressurized water nuclear reactor.
Figure 11:
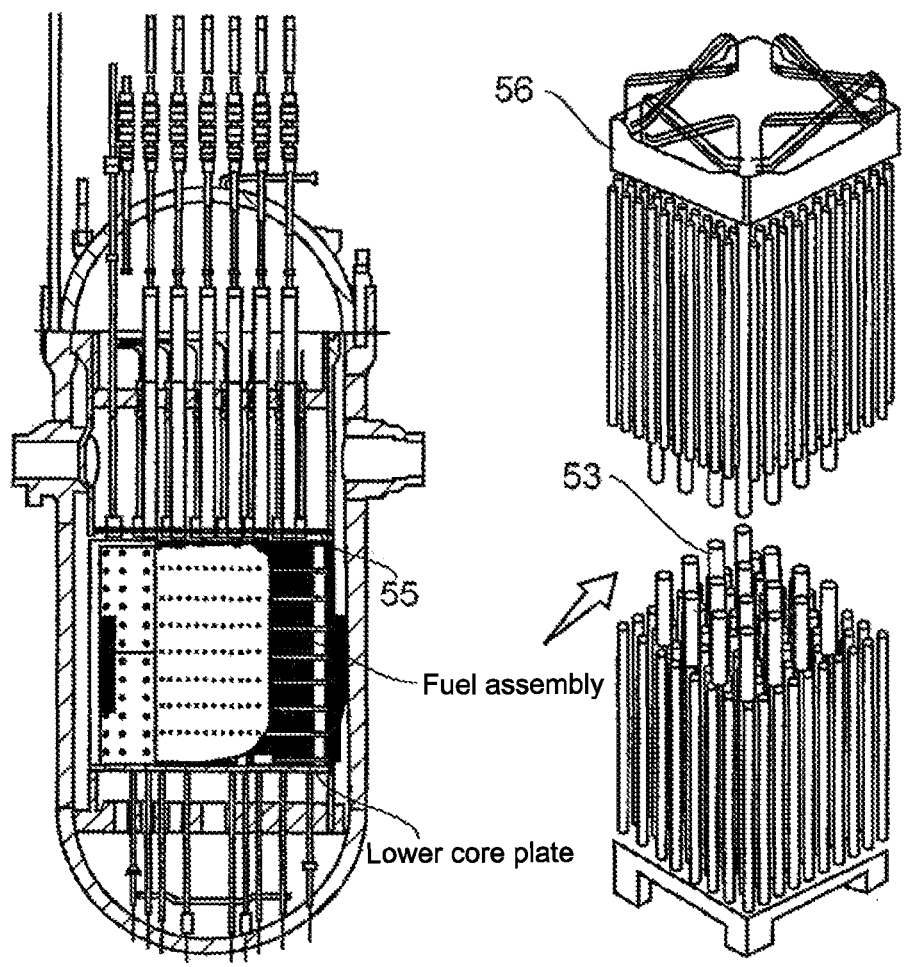
FIG. 11 is a schematic perspective view illustrating the conventional configurations of a fuel assembly and a control rod assembly.
Figure 12:
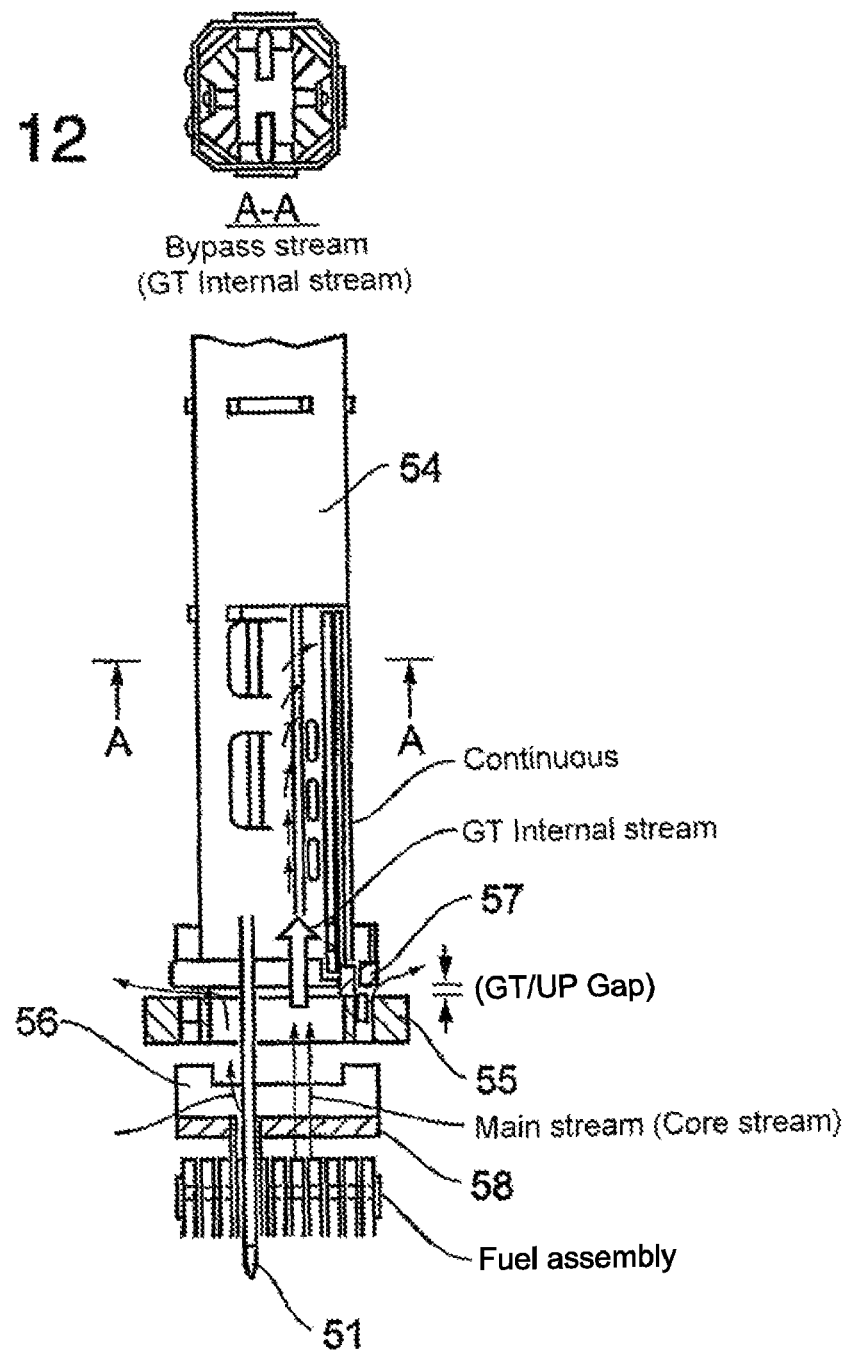
FIG. 12 is a conception view for explaining directions of flows of coolant in a gap with respect to the upper nozzle of a fuel assembly.
Figure 13:
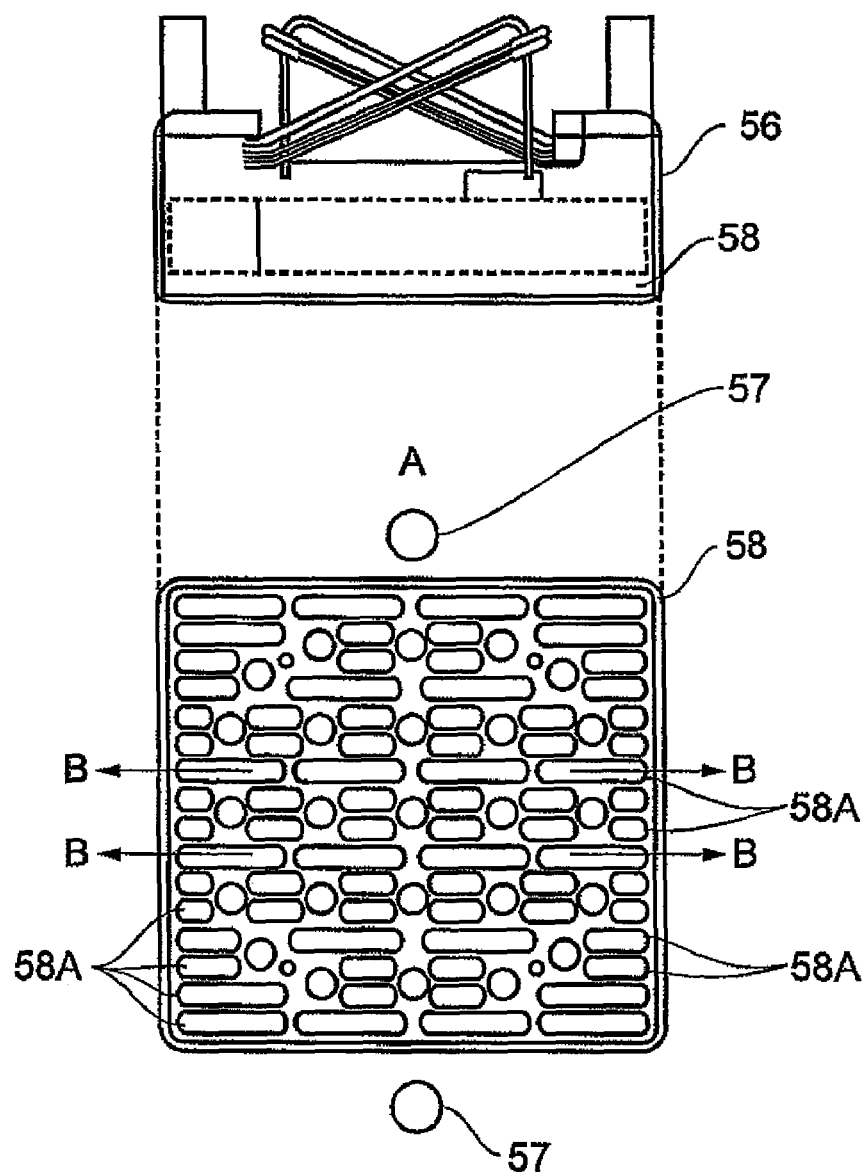
FIG. 13 is a schematic view illustrating conventional configurations of an upper nozzle and an adapter plate.

FIGS. 6 to 9 show arrangement patterns corresponding to those of the embodiments 1 to 4, as applied examples, that is, an arrangement pattern in an embodiment 5 shown in FIG. 6 corresponds to that of the embodiment 1, an arrangement pattern in an embodiment 6 shown in FIG. 7 to that of the embodiment 2, an arrangement pattern in an embodiment 7 shown in FIG. 8 to that of the embodiment 3, and an arrangement pattern 8 in an embodiment 8 shown in FIG. 9 to that of the embodiment 4. In each of these embodiments, the passage holes 15A, 15B, 15C which are located at positions where the coolant impinges upon the overhang 8 are connected together so as to form elongated passage holes 15A' having a length which is longer than the passage holes located in the inner side of the passage surface. In these embodiments, although the three passage holes are connected together so as to form a long elongated passage hole 15A', the present invention should not be limited to such configurations. Accordingly, the present invention may include such a configuration that elongated passage holes formed at positions where the coolant impinges upon the overhang 8 have lengths which are longer than that of the passage holes located inside thereof.

In view of the above-mentioned embodiments, the pressing force caused by the flows of the coolant from the passage holes 15A' becomes larger, thereby it is possible to further restrain vibration of the control rods.

Industrial Applicability

According to the present invention, the vibration of the control rods can be restrained so that the outer surfaces of the control rods and the inner surfaces of the control guide tubes can hardly be locally worn, thereby the present invention can preferably applied in a pressurized water nuclear reactor.

The invention claimed is:

1. A fuel assembly for a PWR nuclear reactor wherein an upper nozzle arranged above the fuel assembly comprises:
    an adapter plate constituting a lower structure of the upper nozzle, and being formed in a square shape whose two diagonal lines orthogonal to each other pass through a center and diagonal corners of a passage surface of the adapter plate;
    a plurality of upright side walls extended in an upright direction along sides of the periphery of the adapter plate;
    an overhang projected into a center area of a space above the adapter plate from the upper part of the side wall; and
    apertures for attaching control rod guide tubes and passage holes, which are formed in a passage surface of the adapter plate,
    wherein the passage holes in the passage surface of the adapter plate include: one or more of first passage holes located on an area where coolant impinges upon the overhang, the first passage holes being generally arranged line-symmetric with respect to one diagonal line of said two diagonal lines serving as a symmetric axis, and second passages holes which are not at least partially covered by the overhang, and
    wherein first ligaments around the first passage holes which are completely covered by the overhang projected from the side walls and are located on an outer side of those of the attaching apertures which are located on the outer peripheral side of the passage surface, are set to be larger than second ligaments around the second passage holes located on opposite transverse sides of those of the attaching apertures, further wherein one or more elongated holes constituting the first passage holes are extended such that a longitudinal direction of the one or more elongated holes extends in parallel to the corresponding side wall located in areas that are line-symmetrical with respect to the one diagonal line.

2. A fuel assembly for a PWR nuclear reactor as set forth in claim 1, wherein passage holes for rectifying the coolant flow are arranged in an adjacent area of the attaching apertures which are located along the symmetric axes.

3. A fuel assembly for a PWR nuclear reactor as set forth in claim 1, wherein elongated passage holes for rectifying the coolant flow are arranged at positions on an inner side of the passage surface closer to a center of the passage surface than positions where the overhang is provided.

4. A fuel assembly for a PWR nuclear reactor as set forth in claim 1, wherein said first passage holes are a plurality of elongated holes provided along and parallel to the side walls.

5. A nuclear reactor core comprising a plurality of the fuel assemblies as recited in claim 1 arranged evenly in the nuclear reactor core.

6. A fuel assembly for a PWR nuclear reactor as set forth in claim 4, wherein the first passage holes which are formed at positions where the coolant impinged upon the overhang, are elongated so as to have a length which is longer than that of the passage holes which are located at positions on an inner side of the passage surface closer to a center of the passage surface than positions where the overhang is provided.

7. A fuel assembly for a PWR nuclear reactor as set forth in claim 6, wherein one elongated hole is provided as the first passage hole along each of the side walls located in the areas that are line-symmetrical with respect to said one diagonal line such that said one elongated hole is parallel to the corresponding side wall so that said one elongated hole is provided along each of the side walls.

* * * * *